(12) United States Patent
Wang et al.

(10) Patent No.: US 12,510,589 B2
(45) Date of Patent: Dec. 30, 2025

(54) METHOD OF MEASURING CHIP CHARACTERISTICS, TEST DEVICE AND NON-TRANSITORY COMPUTER READABLE MEDIA

(71) Applicants: GLOBAL UNICHIP CORPORATION, Hsinchu (TW); TAIWAN SEMICONDUCTOR MANUFACTURING COMPANY, LTD., Hsinchu (TW)

(72) Inventors: Ting-Hao Wang, Hsinchu (TW); Pei-Ju Lin, Hsinchu (TW)

(73) Assignees: GLOBAL UNICHIP CORPORATION, Hsinchu (TW); TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 420 days.

(21) Appl. No.: 18/163,888

(22) Filed: Feb. 3, 2023

(65) Prior Publication Data
US 2024/0159822 A1    May 16, 2024

(30) Foreign Application Priority Data
Nov. 16, 2022   (TW) .................................. 111143731

(51) Int. Cl.
*G01R 31/28*    (2006.01)
(52) U.S. Cl.
CPC ..... *G01R 31/2882* (2013.01); *G01R 31/2868* (2013.01); *G01R 31/2879* (2013.01)

(58) Field of Classification Search
CPC ............ G01R 31/2882; G01R 31/2868; G01R 31/2879; G01R 31/3004; G01R 31/31727
See application file for complete search history.

(56) References Cited

U.S. PATENT DOCUMENTS

| | | | |
|---|---|---|---|
| 9,502,956 B1* | 11/2016 | Yeo | G01R 31/26 |
| 2022/0404417 A1* | 12/2022 | Kim | H03L 7/099 |
| 2023/0014148 A1* | 1/2023 | Liao | H01L 22/34 |
| 2023/0049110 A1* | 2/2023 | Han | G01R 31/3177 |

FOREIGN PATENT DOCUMENTS

| | | |
|---|---|---|
| TW | I670943 B | 9/2019 |
| TW | I747561 B | 11/2021 |

* cited by examiner

*Primary Examiner* — Ricky Go
(74) *Attorney, Agent, or Firm* — CKC & Partners Co., LLC

(57) ABSTRACT

A method of measuring chip characteristics includes: outputting an operating voltage to a chip by a test device, wherein the chip comprises a plurality of oscillator circuits configured to generate a plurality of oscillating signals according to the operating voltage; and testing the chip by the test device under a situation that the test device outputs a system clock signal having a first clock period to the chip, including: changing the operating voltage sequentially with the test device until the chip changes from a normal state to a failure state, so as to generate a boundary operating voltage; and recording the plurality of oscillating signals generated according to the boundary operating voltage as measurement data by the test device, wherein the measurement data represents chip characteristics of the chip corresponding to the first clock period.

14 Claims, 7 Drawing Sheets

METHOD OF MEASURING CHIP CHARACTERISTICS, TEST DEVICE AND NON-TRANSITORY COMPUTER READABLE MEDIA

RELATED APPLICATIONS

This application claims priority to Taiwan Application Serial Number 111143731, filed on Nov. 16, 2022, which is herein incorporated by reference in its entirety.

BACKGROUND

Field of Invention

The present disclosure is related to a chip performance estimation technology. More particularly, the present disclosure is related to a method of measuring chip characteristics, a test device and a non-transitory computer readable media.

Description of Related Art

The post-silicon validation stage includes testing the performance, functionality and reliability of the chip. The signal transmission characteristics of the critical path can be used to estimate the performance of the integrated circuit because the critical path determines the highest operating frequency of the chip, but the critical path is usually blocked by the stacked components and packaging materials in the chip, which causes the chip performance cannot be properly analyzed in the post-silicon validation stage. For similar reasons, the chip characteristics of the chip are also difficult to be measured directly in the post-silicon validation stage, which makes the chip unable to obtain comprehensive and complete reliability testing.

SUMMARY

The present disclosure provides a method of measuring chip characteristics including the following steps: outputting, by a test device, an operating voltage to a chip, wherein the chip comprises a plurality of oscillator circuits configured to generate a plurality of oscillating signals according to the operating voltage; and testing, by the test device, the chip under a situation that the test device outputs a system clock signal having a first clock period to the chip. Testing, by the test device, the chip under a situation that the test device outputs a system clock signal having a first clock period to the chip includes the following steps: changing, by the test device, the operating voltage sequentially until the chip changes from a normal state to a failure state, so as to generate a first boundary operating voltage; and recording, by the test device, the plurality of oscillating signals generated according to the first boundary operating voltage as first measurement data, wherein the first measurement data represents the chip characteristics of the chip corresponding to the first clock period.

The present disclosure provides a test device configured to test a chip and comprising a power supply circuit, a clock generating circuit and a calculating circuit. The power supply circuit is configured to output an operating voltage. The clock generating circuit is configured to output a system clock signal. The calculating circuit is configured to perform: controlling the power supply circuit to output the operating voltage to the chip, wherein the chip comprises a plurality of oscillator circuits configured to generate a plurality of oscillating signals according to the operating voltage; and the testing the chip under a situation that the calculating circuit controls the clock generating circuit to output the system clock signal having a first clock period to the chip. Testing the chip under a situation that the calculating circuit controls the clock generating circuit to output the system clock signal having the first clock period to the chip includes the following steps: controlling the power supply circuit to change the operating voltage sequentially until the chip changes from a normal state to a failure state, so as to generate a first boundary operating voltage; and recording the plurality of oscillating signals generated according to the first boundary operating voltage as first measurement data, wherein the first measurement data represents chip characteristics of the chip corresponding to the first clock period.

The present disclosure provides a non-transitory computer readable media comprising a plurality of computer readable instructions. When a test device executes the plurality of computer readable instructions, the plurality of computer readable instructions make the test device perform the following operations: outputting an operating voltage to a chip, wherein the chip comprises a plurality of oscillator circuits configured to generate a plurality of oscillating signals according to the operating voltage; and testing the chip under a situation that the test device outputs a system clock signal having a first clock period to the chip. Testing the chip under a situation that the test device outputs a system clock signal having the first clock period to the chip includes the following steps: changing the operating voltage sequentially until the chip changes from a normal state to a failure state, so as to generate a first boundary operating voltage; and recording the plurality of oscillating signals generated according to the first boundary operating voltage as first measurement data, wherein the first measurement data represents the chip characteristics of the chip corresponding to the first clock period.

One of the advantages of the above-mentioned method of measuring chip characteristics, test device and non-transitory computer readable media is that various chip characteristics of the chip can be measured without destroying the package and semiconductor structure of the chip.

It should be understood that both the foregoing general description and the following detailed description are by examples, and are intended to provide further explanation of the disclosure as claimed.

DETAILED DESCRIPTION

Figure 1:
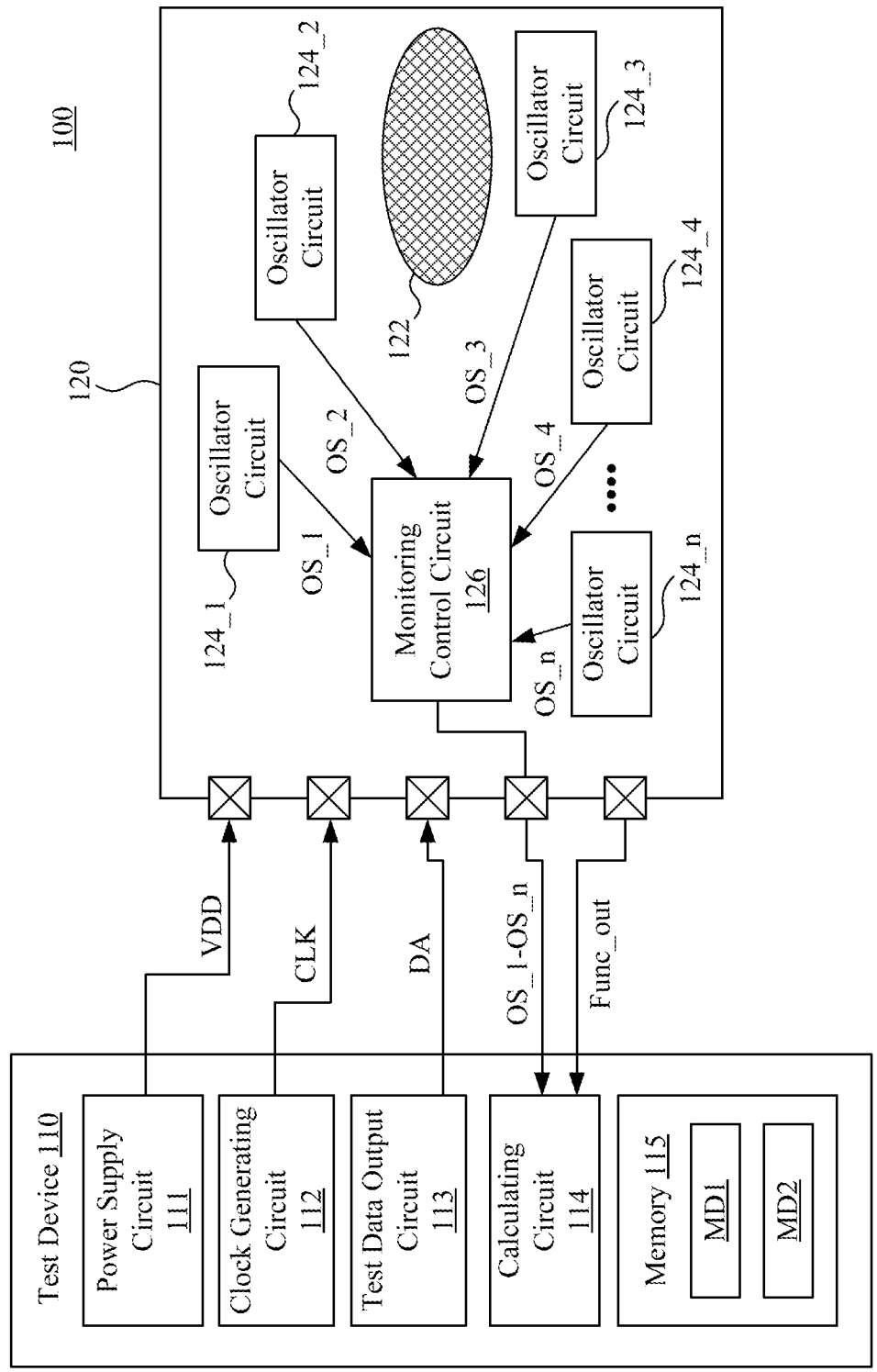
FIG. 1 is a simplified functional block diagram of a chip characteristic measurement system in accordance with an embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts.

As used in the present disclosure, the terms "about" or "approximately" generally refers to the error or range of the value within about 20%, preferably within about 10%, and more preferably within about 5%. If there is no explicit statement in the description, the numerical values mentioned are regarded as approximate values, that is, the error or range indicated by the terms "about" or "approximately".

FIG. 1 is a simplified functional block diagram of a chip characteristic measurement system 100 in accordance with an embodiment of the present disclosure. The chip characteristic measurement system 100 comprises a test device 110 and a chip 120. The test device 110 is used to test the functions and performance of the chip 120. In one embodiment, the test device 110 comprises a power supply circuit 111, a clock generating circuit 112, a test data output circuit 113, a calculating circuit 114 and a memory 115.

The power supply circuit 111 is used to output an operating voltage VDD to the chip 120 and is used to adjust the magnitude of the operating voltage VDD according to the control of the calculating circuit 114. The clock generating circuit 112 is used to output a system clock signal CLK to the chip 120, and is used to adjust the clock period of the system clock signal CLK according to the control of the calculating circuit 114. The test data output circuit 113 is used to output test data DA to the chip 120 according to a preset pattern (such as a functional pattern) to perform a functional test on the chip 120, wherein the preset pattern can be stored in the memory 115.

The calculating circuit 114 is used to receive a chip function test result Func_out from the chip 120, wherein the chip function test result Func_out is generated by a logic circuit in the chip 120 and according to the test data DA. For the sake of brevity, FIG. 1 only shows a part of the logic circuit in the chip 120: a critical path 122 of the chip 120. The calculating circuit 114 judges the operation state of the chip 120 under the current operating condition according to the chip function test result Func_out, such as a normal state or a failure state.

In some embodiments, the memory 115 stores an ideal test result corresponding to the chip function test result Func_out, and the computing circuit 114 compares the chip function test result Func_out with the ideal test result. If the number of the difference between the values of the chip function test result Func_out and the values of the ideal test result is within an expected range, the calculating circuit 114 determines that the operation state of the chip 120 is the normal state. On the contrary, the calculating circuit 114 determines that the operation state of the chip 120 is the failure state.

In some embodiments, the chip 120 comprises a plurality of oscillator circuits 124_1-124_$n$ and a monitor control circuit 126. The oscillator circuits 124_1-124_$n$ are disposed at different locations of the chip 120. The oscillator circuits 124_1-124_$n$ are used to generate a plurality of oscillating signals OS_1-OS_$n$ respectively. The monitor control circuit 126 is coupled to the oscillator circuits 124_1-124_$n$, is used to receive the oscillating signals OS_1-OS_$n$, and is used to perform signal processing such as filtering and amplification on the oscillating signals OS_1-OS_$n$. The monitor control circuit 126 is further coupled to the calculating circuit 114 and is used to transmit the oscillating signals OS_1-OS_$n$ to the calculating circuit 114, thus the calculating circuit 114 can analyze the chip characteristics of the chip 120 under the current test condition.

It is worth mentioning that at least part of the oscillator circuits 124_1-124_$n$ are arranged near the critical path 122 of the chip 120, so the oscillating signals OS_1-OS_$n$ can be used to estimate the performance of the chip 120. The following description will be carried out in conjunction with FIG. 7-FIG. 9.

In some embodiments, the test device 110 is automatic test equipment (ATE). In some embodiments, the computing circuit 114 can be implemented by one or more general processors, digital signal processors, application specific integrated circuits, field programmable gate arrays, other programmable logic devices or any combination thereof.

Figure 2:
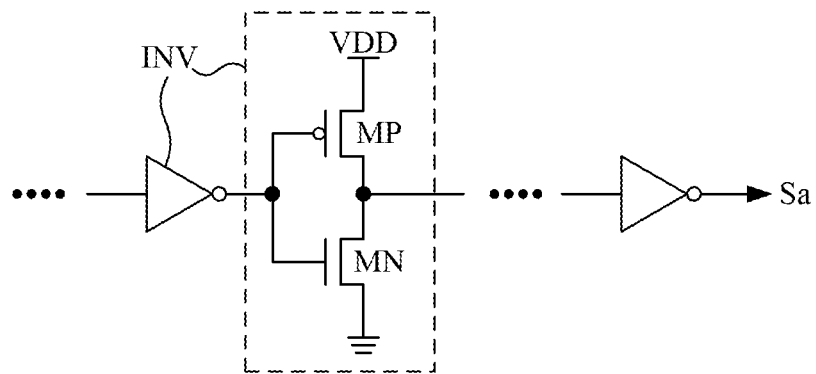
FIG. 2 is a simplified functional block diagram of a ring oscillator in accordance with an embodiment of the present disclosure.
Figure 3:
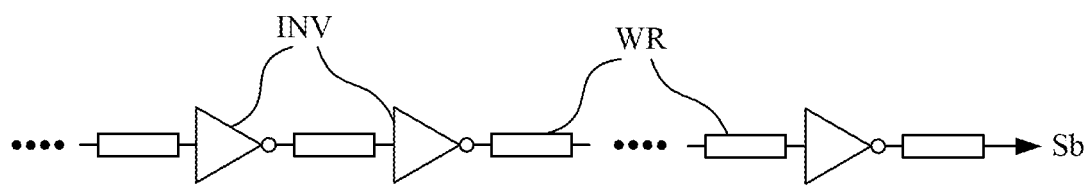
FIG. 3 is a simplified functional block diagram of a ring oscillator in accordance with an embodiment of the present disclosure.
Figure 4:
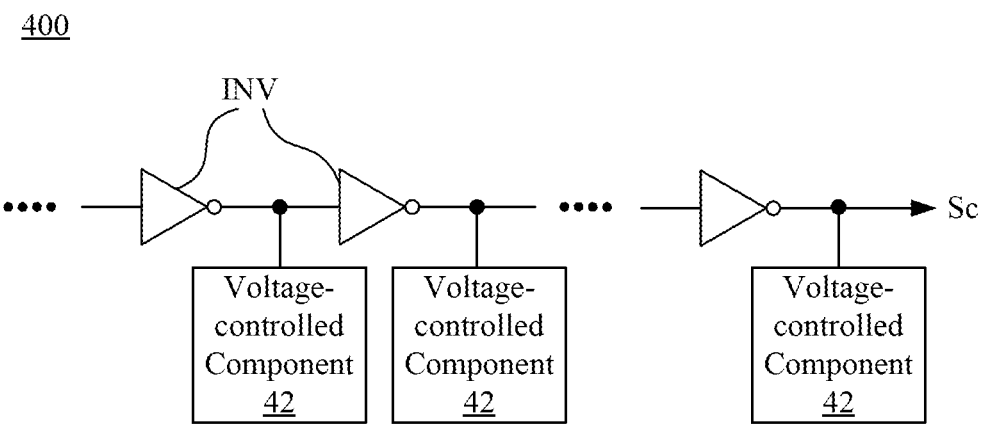
FIG. 4 is a simplified functional block diagram of a ring oscillator in accordance with another embodiment of the present disclosure.

The method of implementing the oscillator circuits 124_1-124_$n$ in FIG. 1 with different ring oscillators will be described below. FIG. 2-FIG. 4 are simplified functional block diagrams of ring oscillator 200, 300 and 400 in accordance with various embodiments of the present disclosure. Please refer to FIG. 2 first, the ring oscillator 200 comprises a plurality of inverters INV coupled in series and is used to generate a sensing signal Sa. The inverter INV comprises a P-type transistor MP and an N-type transistor MN coupled in series, wherein the P-type transistor MP is used to receive the operating voltage VDD. The inverters INV in FIG. 2-FIG. 4 have similar components and connection relationship, and for the sake of brevity, the same description is omitted below.

Please refer to FIG. 3, the ring oscillator 300 is used to generate a sensing signal Sb and comprises a plurality of inverters INV and a plurality of wires WR alternately coupled in series, that is, a wire WR is arranged between two adjacent inverters INV, wherein the wires WR are implemented by a specified metal layer. Next, please refer to FIG. 4, the ring oscillator 400 is used to generate a sensing signal Sc and comprises a plurality of inverters INV coupled in series, wherein voltage-controlled components 42 are respectively coupled between two adjacent inverters INV. The voltage-controlled components 42 can be regarded as a load of the inverters INV. The operating voltage VDD can be used to set the chip characteristics of the voltage-controlled components 42. For example, the voltage-controlled components 42 can be implemented by voltage-controlled capacitors whose capacitance value changes with the operating voltage VDD.

In some embodiments, each of the oscillator circuits 124_1-124_$n$ in FIG. 1 includes at least one ring oscillator 200, at least one ring oscillator 300, at least one ring oscillator 400 or any combination thereof, that is, each of the oscillating signals OS_1-OS_$n$ includes at least one sensing signal Sa, at least one sensing signal Sb, at least one sensing signal Sc or any combination thereof. The P-type transistors MP and/or the N-type transistors MN of the plurality of ring oscillators 200 have different threshold voltages, so that the periods of the plurality of sensing signals Sa can be used to reflect the process variation of the chip 120. The wires WR of the plurality of ring oscillators 300 are implemented by different metal layers, so that the periods of the plurality of sensing signals Sb can be used to reflect the variation of the parasitic elements of the chip 120. In addition, the periods of the sensing signals Sc can be used to reflect the variation of the operating voltage VDD.

It can be seen from the above that the oscillator circuits 124_1-124_n generate oscillating signals OS_1-OS_n according to the operating voltage VDD. The calculating circuit 114 can obtain the process variation, the variation of the parasitic elements and/or the variation of the operating voltage VDD of the position corresponding to the oscillating signal by analyzing the period of each of the oscillating signals OS_1-OS_n.

Figure 5:
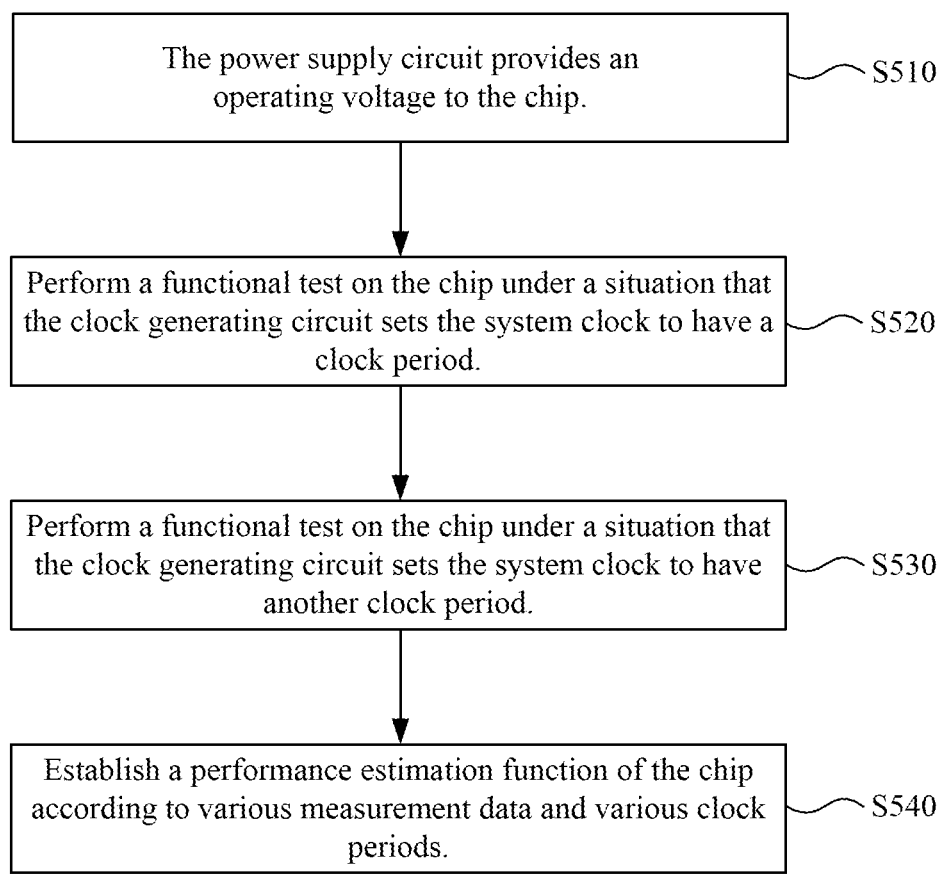
FIG. 5 is a flow chart of a method of measuring chip characteristics in accordance with yet another embodiment of the present disclosure.

FIG. 5 is a flow chart of a method of measuring chip characteristics 500 in accordance with an embodiment of the present disclosure. Any combination of features of the method of measuring chip characteristics 500 or other methods described herein can be implemented by a plurality of computer readable instructions stored in a non-transitory computer readable media. When the test device 110 or its computing circuit 114 executes these instructions, these instructions will cause some or all of the aforementioned methods to be executed. It should be understood that any method described herein can include more or fewer steps than shown in the flowchart, and that the steps in the method can be performed in any suitable order.

Please refer to FIG. 1 and FIG. 5 at the same time. In step S510, the calculating circuit 114 can control the power supply circuit 111 to provide the operating voltage VDD to the chip 120, so that the oscillator circuits 124_1-124_n generate oscillating signal OS_1-OS_n according to the operating voltage VDD.

In step S520, the computing circuit 114 performs a functional test on the chip 120. The calculating circuit 114 controls the clock generating circuit 112 to set the system clock signal CLK to have the first clock period P1, and outputs the system clock signal CLK to the chip 120. The calculating circuit 114 also controls the test data output circuit 113 to output the test data DA to the chip 120. In this way, the logic circuit (including the critical path 122) in the chip 120 will perform logic operations according to the system clock signal CLK and the test data DA, so that the chip 120 will output the chip function test result Func_out. The calculating circuit 114 can use the chip function test result Func_out to obtain the chip characteristics of the chip 120 under specific test conditions, please refer to the following descriptions of step S520.

Figure 6:
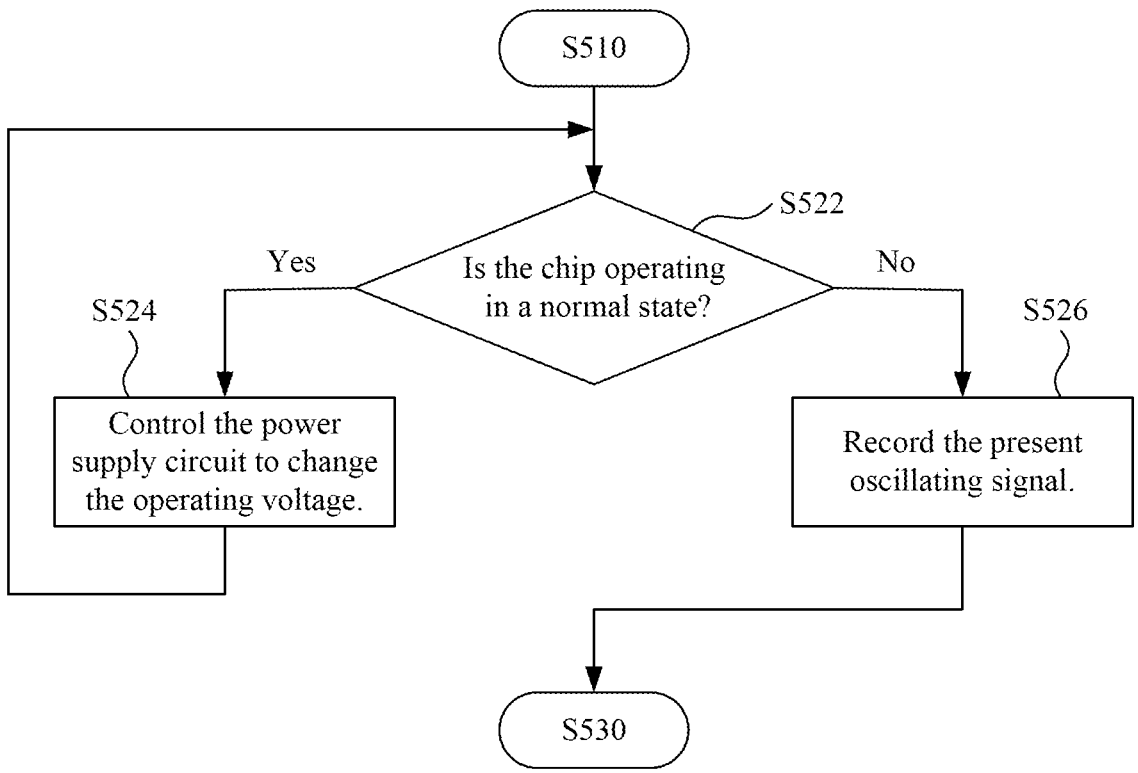
FIG. 6 is a detailed flow chart of the method of measuring chip characteristics in FIG. 5.

In some embodiments, as shown in FIG. 6, step S520 includes steps S522-S526. In step S522, the calculating circuit 114 determines whether the chip 120 is in the normal state according to the chip function test result Func_out. When the chip 120 is in the normal state, the calculating circuit 114 executes step S524 to control the power supply circuit 111 to change (e.g., decrease or increase) the operating voltage VDD. After step S524 ends, the computing circuit 114 will execute step S522 again. On the other hand, when the chip 120 is in a failure state (that is, the judgment of step S522 is No), the calculating circuit 114 will execute step S526 to record the period of the current oscillating signal OS_1-OS_n in the memory 115 as measurement data MD1, wherein the measurement data MD1 represents the chip characteristics of the chip 120 corresponding to the first clock period P1.

In other words, the power supply circuit 111 will sequentially change (for example, sequentially decrease or sequentially increase) the operating voltage VDD until the chip 120 changes from the normal state to the failure state. For the sake of brevity, the operating voltage VDD in this case will be referred to as "first boundary operating voltage" in following paragraphs. The calculating circuit 114 records the oscillating signals OS_1-OS_n generated by the oscillator circuits 124_1-124_n according to the first boundary operating voltage. In this way, the calculating circuit 114 can obtain the process variation, the variation of the parasitic elements and/or the variation of the operating voltage VDD under the test condition with the first clock cycle P1 and the first boundary operating voltage, without destroying the package and semiconductor structure of the chip 120. In addition, the calculating circuit 114 can also obtain the data delay time TD of the test data DA on the critical path 122 under the aforementioned test condition, which will be described in conjunction with FIG. 7-FIG. 9 below.

Figure 7:
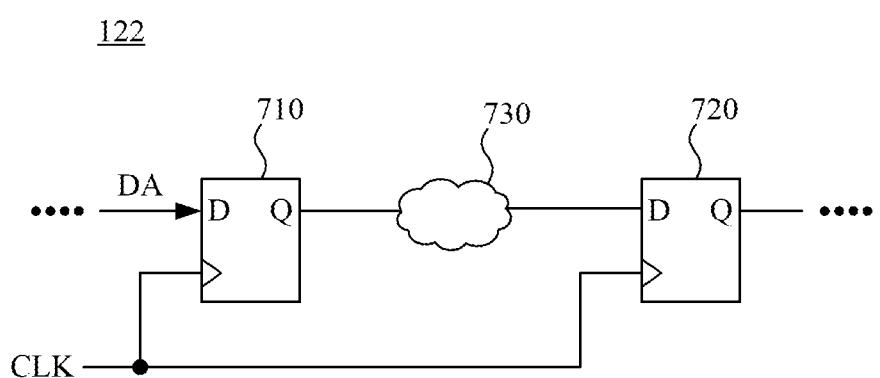
FIG. 7 is a schematic diagram of a partial circuit of a critical path in accordance with an embodiment of the present disclosure.

FIG. 7 is a schematic diagram of a partial circuit of a critical path 122 in accordance with an embodiment of the present disclosure. The critical path 122 comprises flip-flops 710-720 and a combinational logic unit 730. Each of the flip-flops 710-720 includes an input terminal D and an output terminal Q. The combinational logic unit 730 is coupled in series between the flip-flops 710-720. The flip-flops 710-720 cache the test data DA according to the system clock signal CLK, and the test data DA is sequentially transmitted between the flip-flops 710-720 and the combinational logic unit 730.

Figure 8:
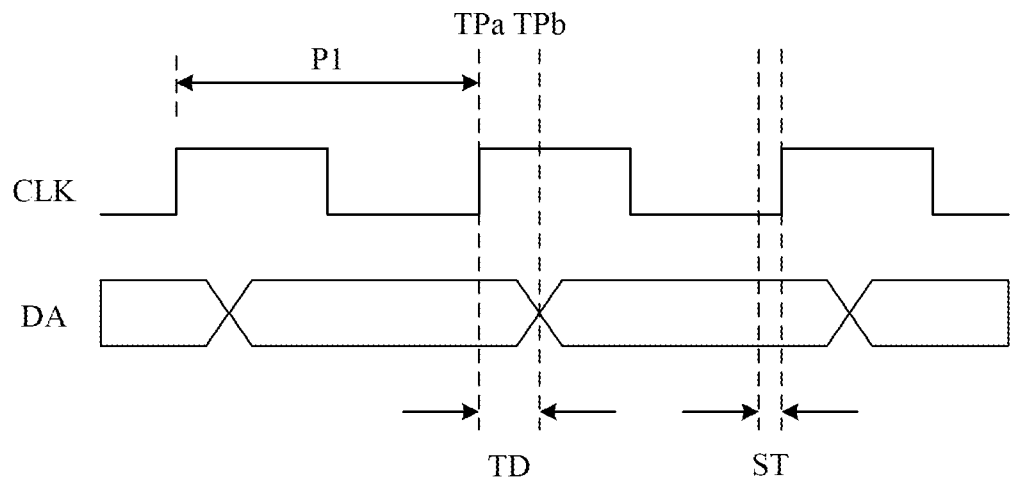
FIG. 8 is a waveform diagram of internal signals of the chip in accordance with an embodiment of the present disclosure.
Figure 9:
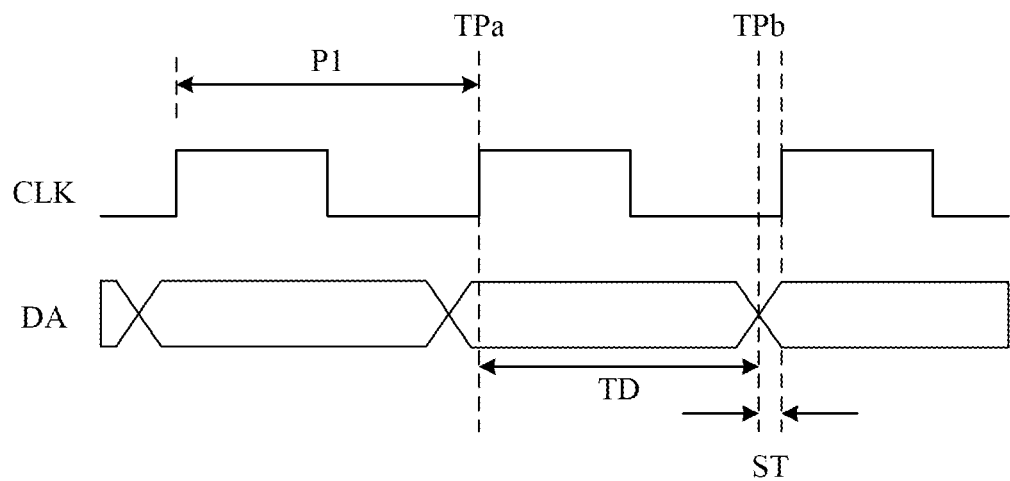
FIG. 9 is a waveform diagram of internal signals of the chip in accordance with another embodiment of the present disclosure.

FIG. 8-FIG. 9 are waveform diagrams of internal signals of the chip 120 in accordance with some embodiments of the present disclosure. The data delay time TD in FIG. 8 corresponds to the operating voltage VDD that has not been changed (e.g., lowered or raised). The data delay time TD can be defined as the signal transmission delay time caused by the combinational logic unit 730 when the test data DA is transmitted to the flip-flop 720 from the flip-flop 710. In some embodiments, the starting point of the data delay time TD can be the time TPa when the flip-flop 720 performs the previous sampling, and the ending point of the data delay time TD can be the time TPb when the test data DA received by the flip-flop 720 changes from the previous value sampled by the flip-flop 720 to a new value.

Under the situation that the system clock signal CLK keeps in the first clock period P1, when the operating voltage VDD gradually changes (e.g., gradually decreases or increases), the length of the data delay time TD shown in FIG. 8 will gradually increase. When the operating voltage VDD changes to the first boundary operating voltage, as shown in FIG. 9, the sum of the data delay time TD of the critical path 122 and the setup time ST of the critical path 122 is approximately equal to the first clock period P1, and the chip 120 will change to the failure state. The reason is that the setup time ST is the time of the test data DA being updated and keeping stable before the sampling of the flip-flop 720, and when the ending point of the data delay time TD overlaps or exceeds the starting point of the setup time ST, the test data DA cannot keep stable in the setup time ST.

It can be seen from the above descriptions in conjunction with FIG. 7-FIG. 9 that the data delay time TD can be measured without destroying the package and semiconductor structure of the chip 120. When the chip 120 operates according to the first boundary operating voltage and changes to the failure state, the data delay time TD can be calculated from the first clock period P1, that is, the data delay time TD is approximately equal to the setup time ST subtracted from the first clock period P1. In some embodiments, when the chip 120 operates according to the first boundary operating voltage and changes to the failure state, the first clock period P1 is approximately equal to the data delay time TD because the setup time ST is relatively short. In this way, the calculating circuit 114 can obtain the data delay time TD on the critical path 122 under the test condition with the first clock period P1 and the first boundary operating voltage. In some embodiments, the data delay time TD on the critical path 122 can be used to evaluate the performance of the chip 120, for example, the shorter the data delay time TD, the higher the performance of the chip 120.

Please refer to FIG. 5 again, the method of measuring chip characteristics 500 further includes step S530. Since step S530 is similar to step S520, only the differences between the two steps will be described below. In step S530, the calculating circuit 114 controls the clock generating circuit 112 to set the system clock signal CLK to have a second clock period, and output the system clock signal CLK to the chip 120, wherein the second clock period is different from the first clock period P1. The calculating circuit 114 will control the power supply circuit 111 to change (e.g., gradually decreases or increases) the operating voltage VDD sequentially until the chip 120 changes from the normal state to the failure state. For the sake of brevity, the operating voltage VDD in this case will be referred to as "second boundary operating voltage" in following paragraphs. When the chip 120 is in the failure state, the calculating circuit 114 will record the period of the current oscillating signal OS_1-OS_n in the memory 115 as measurement data MD2, wherein the measurement data MD2 represents the chip characteristics of the chip 120 corresponding to the second clock period. In this way, the calculating circuit 114 can obtain the process variation, the variation of the parasitic elements and/or the variation of the operating voltage VDD of the chip 120 under the test condition with the second clock period and the second boundary operating voltage, and obtain the data delay time TD on the critical path 122 (i.e., the performance of the chip 120).

In some embodiments, the method of measuring chip characteristics 500 further includes step S540. In step S540, the calculating circuit 114 establishes a performance estimation function of the chip 120 according to the measurement data MD1, the measurement data MD2, the first clock period P1 and the second clock period. The performance estimation function is used for calculating the relationship between the magnitude of the operating voltage VDD and the data delay time TD (i.e., the performance of the chip 120). The performance estimation function can be represented by the following formula (1). The symbol "Psys" represents the clock period of the system clock signal CLK; the symbol "K" represents the weight; the symbol "$TROS_i$(VDD)" represents the period of the oscillating signal OS_1-OS_n, wherein i and n are positive integers. Since the periods of the oscillating signals OS_1-OS_n vary with the operating voltage VDD, the periods of the oscillating signals OS_1-OS_n can be expressed as a function of the operating voltage VDD.

$$Psys = TD + ST = E_i^n \times TROS_i(VDD) \quad \text{formula (1)}$$

The first clock period P1 and the measurement data MD1 (i.e., the periods of the oscillating signals OS_1-OS_n obtained in step S520) can be used as one set of solutions of the performance estimation function, that is, when the periods of the oscillating signals OS_1-OS_n in the measurement data MD1 are multiplied by the above weights respectively, the sum of them will equal to the first clock period P1. The second clock period and the measurement data MD2 (i.e., the periods of the oscillating signals OS_1-OS_n obtained in step S520) can be used as another set of solutions of the performance estimation function, that is, when the periods of the oscillating signals OS_1-OS_n in the measurement data MD2 are multiplied by the above weights respectively, the sum of them will equal to the second clock period. Based on the above conditions, the calculating circuit 114 can perform operations such as interpolation or polynomial regression for multiple times to obtain multiple weights of the performance estimation function.

In conclusion, with the performance estimation function, the calculating circuit 114 or other electronic devices with logic computing capabilities can simply predict the data delay time TD (i.e., the performance of the chip 120) when the chip 120 operates according to different operating voltages VDD, which is helpful to speed up the validation process of the chip 120 and reduce the hardware requirements of the validation process.

Certain terms are used in the description and claim to refer to particular elements. However, it should be understood by those skilled in the art that the same elements may be referred to by different terms. The description and the claims do not take the difference in name as a way of distinguishing elements, but take the difference in function of the elements as a basis for distinguishing. The term "comprising" mentioned in the description and the claims is an open-ended term, so it should be interpreted as "including but not limited to". In addition, the term "coupled" herein includes any direct and indirect means of connection. Therefore, if it is described in the description and the claims that the first element is coupled to the second element, it means that the first element may be directly connected to the second element through electrical connection or signal connection such as wireless transmission or optical transmission, or through other elements or connections.

As used herein, the term "and/or" includes any combination of one or more of the mentioned elements. Unless otherwise specified in the description, any term in the singular also includes the meaning in the plural.

The above are preferred embodiments of the present disclosure, and various modifications and equivalent changes may be made to the structure of the present disclosure without departing from the scope or spirit of the present disclosure. In view of the foregoing, it is intended that the present disclosure cover modifications and variations of this invention provided they fall within the scope of the following claims.

What is claimed is:

1. A method of measuring chip characteristics, comprising:
outputting, by a test device, an operating voltage to a chip, wherein the chip comprises a plurality of oscillator circuits configured to generate a plurality of oscillating signals according to the operating voltage;
testing, by the test device, the chip under a situation that the test device outputs a system clock signal having a first clock period to the chip, comprising:
changing, by the test device, the operating voltage sequentially until the chip changes from a normal state to a failure state, so as to generate a first boundary operating voltage; and
recording, by the test device, the plurality of oscillating signals generated according to the first boundary operating voltage as first measurement data, wherein the first measurement data represents the chip characteristics of the chip corresponding to the first clock period;

testing, by the test device, the chip under a situation that the test device outputs the system clock signal having a second clock period to the chip, comprising:

changing, by the test device, the operating voltage sequentially until the chip changes from the normal state to the failure state, so as to generate a second boundary operating voltage; and recording, by the test device, the plurality of oscillating signals generated according to the second boundary operating voltage as second measurement data, wherein the second measurement data represents the chip characteristics of the chip corresponding to the second clock period; and establishing, by the test device, a performance estimation function of the chip according to the first measurement data, the second measurement data, the first clock period and the second clock period, comprising:

calculating, by the test device, a plurality of weights;

wherein a sum of a plurality of first products, generated by respectively multiplying periods of the plurality of oscillating signals of the first measurement data by the plurality of weights, is equal to the first clock period, wherein a sum of a plurality of second products, generated by respectively multiplying periods of the plurality of oscillating signals of the second measurement data by the plurality of weights, is equal to the second clock period.

2. The method of claim 1, wherein the first clock period is approximately equal to a sum of a data delay time of a critical path of the chip and a setup time of the critical path, under a situation that the chip operates according to the first boundary operating voltage.

3. The method of claim 1, wherein the first clock period is approximately equal to a data delay time of a critical path of the chip under a situation that the chip operates according to the first boundary operating voltage.

4. The method of claim 1, wherein the second clock period is approximately equal to a sum of a data delay time of a critical path of the chip and a setup time of the critical path, under a situation that the chip operates according to the second boundary operating voltage.

5. The method of claim 1, wherein the second clock period is approximately equal to a data delay time of a critical path of the chip under a situation that the chip operates according to the second boundary operating voltage.

6. The method of claim 1, wherein the performance estimation function is for calculating a relationship between magnitude of the operating voltage and a data delay time of a critical path of the chip.

7. A test device, configured to test a chip, comprising:

a power supply circuit, configured to output an operating voltage;

a clock generating circuit, configured to output a system clock signal; and a calculating circuit, configured to perform:

controlling the power supply circuit to output the operating voltage to the chip, wherein the chip comprises a plurality of oscillator circuits configured to generate a plurality of oscillating signals according to the operating voltage;

testing the chip under a situation that the calculating circuit controls the clock generating circuit to output the system clock signal having a first clock period to the chip, comprising:

controlling the power supply circuit to change the operating voltage sequentially until the chip changes from a normal state to a failure state, so as to generate a first boundary operating voltage; and recording the plurality of oscillating signals generated according to the first boundary operating voltage as first measurement data, wherein the first measurement data represents chip characteristics of the chip corresponding to the first clock period;

testing the chip under a situation that the calculating circuit controls the clock generating circuit to output the system clock signal having a second clock period to the chip, comprising:

controlling the power supply circuit to change the operating voltage sequentially until the chip changes from the normal state to the failure state, so as to generate a second boundary operating voltage; and recording the plurality of oscillating signals generated according to the second boundary operating voltage as second measurement data, wherein the second measurement data represents chip characteristics of the chip corresponding to the second clock period; and establishing a performance estimation function of the chip according to the first measurement data, the second measurement data, the first clock period and the second clock period, comprising:

calculating a plurality of weights;

wherein a sum of a plurality of first products, generated by respectively multiplying periods of the plurality of oscillating signals of the first measurement data by the plurality of weights, is equal to the first clock period, wherein a sum of a plurality of second products, generated by respectively multiplying periods of the plurality of oscillating signals of the second measurement data by the plurality of weights, is equal to the second clock period.

8. The test device of claim 7, wherein the first clock period is approximately equal to a sum of a data delay time of a critical path of the chip and a setup time of the critical path, under a situation that the chip operates according to the first boundary operating voltage.

9. The test device of claim 7, wherein the first clock period is approximately equal to a data delay time of a critical path of the chip under a situation that the chip operates according to the first boundary operating voltage.

10. The test device of claim 7, wherein the second clock period is approximately equal to a sum of a data delay time of a critical path of the chip and a setup time of the critical path, under a situation that the chip operates according to the second boundary operating voltage.

11. The test device of claim 7, wherein the second clock period is approximately equal to a data delay time of a critical path of the chip under a situation that the chip operates according to the second boundary operating voltage.

12. The test device of claim 7, wherein the performance estimation function is for calculating a relationship between magnitude of the operating voltage and a data delay time of a critical path of the chip.

13. A non-transitory computer readable media, comprising a plurality of computer readable instructions, wherein the plurality of computer readable instructions, in response to being executed by a test device, make the test device perform following operations:

outputting an operating voltage to a chip, wherein the chip comprises a plurality of oscillator circuits configured to generate a plurality of oscillating signals according to the operating voltage;

testing the chip under a situation that the test device outputs a system clock signal having a first clock period to the chip, comprising:

changing the operating voltage sequentially until the chip changes from a normal state to a failure state, so as to generate a first boundary operating voltage; and recording the plurality of oscillating signals generated according to the first boundary operating voltage as first measurement data, wherein the first measurement data represents chip characteristics of the chip corresponding to the first clock period;

testing the chip under a situation that the test device outputs the system clock signal having a second clock period to the chip, comprising:

changing the operating voltage sequentially until the chip changes from the normal state to the failure state, so as to generate a second boundary operating voltage; and recording the plurality of oscillating signals generated according to the second boundary operating voltage as second measurement data, wherein the second measurement data represents the chip characteristics of the chip corresponding to the second clock period; and establishing a performance estimation function of the chip according to the first measurement data, the second measurement data, the first clock period and the second clock period comprises:

calculating a plurality of weights;

wherein a sum of a plurality of first products, generated by respectively multiplying periods of the plurality of oscillating signals of the first measurement data by the plurality of weights, is equal to the first clock period, wherein a sum of a plurality of second products, generated by respectively multiplying periods of the plurality of oscillating signals of the second measurement data by the plurality of weights, is equal to the second clock period.

14. The non-transitory computer readable media of claim 13, wherein the first clock period is approximately equal to a sum of a data delay time of a critical path of the chip and a setup time of the critical path, under a situation that the chip operates according to the first boundary operating voltage.

* * * * *